Figures 1, 2, 3:
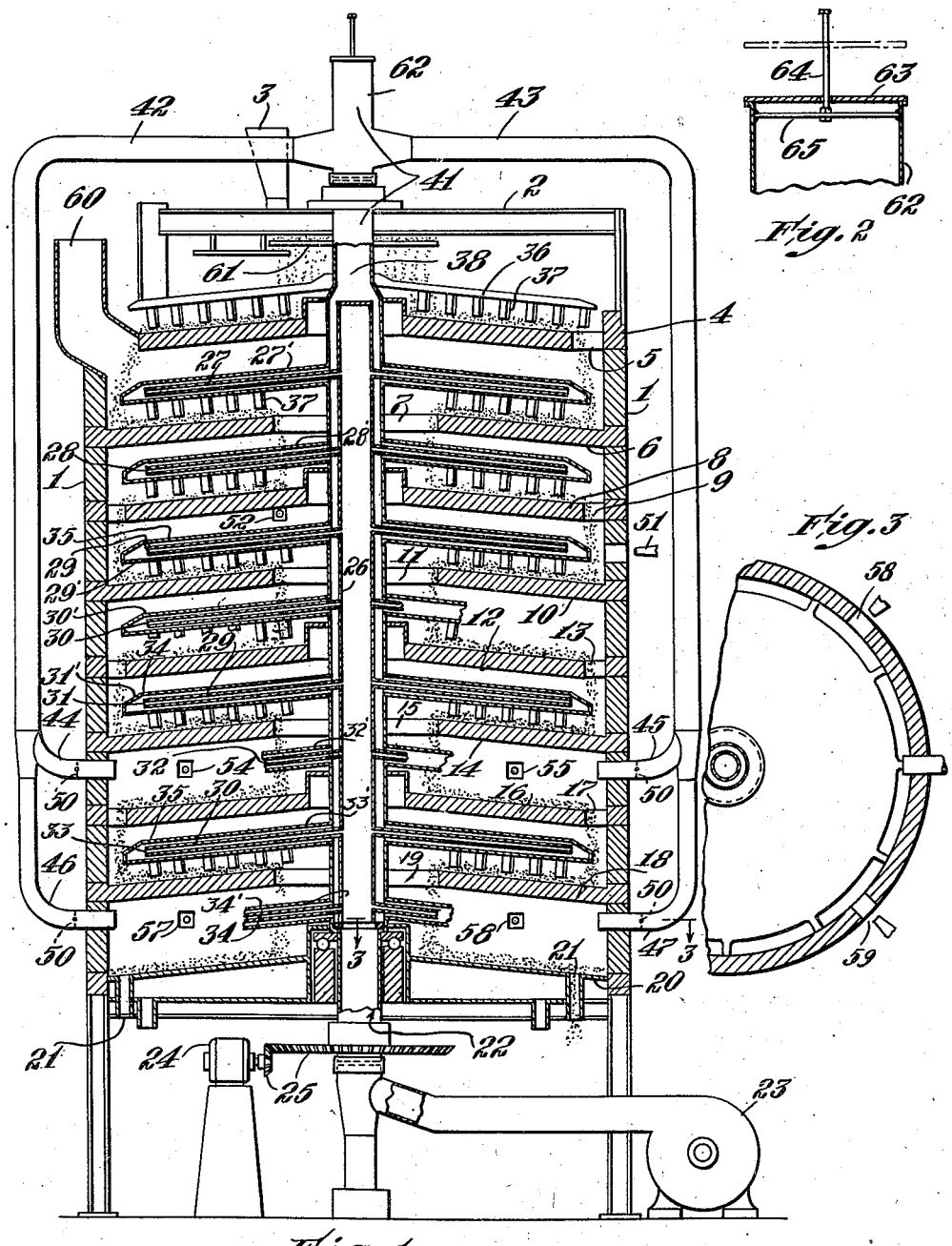

Dec. 30, 1947.  A. W. WHITFORD  2,433,498
METHOD OF ROASTING COPPERAS
Filed Dec. 10, 1942

Inventor
Alfred W. Whitford
by Roberts, Cushman & Woodbury
att'ys.

Patented Dec. 30, 1947

2,433,498

UNITED STATES PATENT OFFICE 2,433,498

METHOD OF ROASTING COPPERAS

Alfred W. Whitford, Watsontown, Pa.

Application December 10, 1942, Serial No. 468,579

5 Claims. (Cl. 23—200)

The present invention relates to a method of roasting wet copperas crystals ($FeSO_4.7H_2O$) to reduce the same to ferric oxide ($Fe_2O_3$), sulphur dioxide, sulphur trioxide, and water, and to apparatus for carrying out the method.

Iron sulphate is produced in various commercial chemical processes as a by-product and in large quantities, usually in aqueous solutions from which it may be recovered by crystallization and separation. It does not find any commensurate utility in this form, but its constituents are valuable and it is important that they should be recovered by a convenient and commercially economical procedure.

In processes heretofore suggested the iron sulphate, which is usually obtained in the form of the hydrous sulphate, copperas ($FeSO_4.7H_2O$), has presented the difficulty of caking upon preliminary heat treatments to remove water. Corrosion of the equipment used has also been encountered and the products obtained have been of varying yield and doubtful quality, and in general of relatively low value accordingly.

It is an object of the present invention to provide a method of reducing wet copperas to its constituents, upon a commercial scale of operations and to yield commercially satisfactory products. It is also an object to provide apparatus which shall be suitable for carrying out the process. Other objects will appear from the following disclosure.

In the present invention it is found that wet copperas may be fed over a succession of horizontal plates or hearths, and by gravity from hearth to hearth and continuously exposed to and heated by a countercurrent stream of hot gases, such as combustion gases and air, and that by such agitation and countercurrent movement and contact of hot gases, through a suitable temperature gradient, the wet copperas crystals will not only be dehydrated but physically disintegrated and chemically decomposed and reduced to ferric oxide ($Fe_2O_3$) in loose, finely divided condition, sulphur dioxide ($SO_2$) and sulphur trioxide ($SO_3$) gases and water vapor ($H_2O$), without encountering the usual difficulties of caking. Moreover, the resulting products as thus obtained are commercially valuable for they are in very favorable condition for direct application to the many uses for which their chemical compositions render them applicable.

Relatively continuous action and progressive movement of the wet copperas, from the time it enters the heat treatment until it is discharged, is desirable. Continued agitation of the mass and frequent intimate exposure to the heating gases is also desirable, as by agitation upon the hearth and free falling from hearth to hearth. It is a feature of the invention to keep all of the charge progressively and uniformly passing through the course of treatment, from start to finish, without accumulating at any point and without any portion being differentially treated, as distinguished from the main stream, etc.

The temperature treatment to which the wet crystals are subjected is characterized by a relatively slow movement of the charge, a relatively fast countercurrent of combustion gases, decomposition gases, and heated air, in intimate direct contact therewith, which is regulated and substantially uniform as to its temperature gradient and as to its composition, from point to point throughout its course, and the attainment of a maximum temperature zone of approximately 1300°–1600° F. at which complete decomposition of the crystals takes place.

While continuous agitation of the entire charge is not necessary, it is essential to success to agitate each part of the entire charge frequently and continually throughout its progress through the heat treatment, from the time when it enters until it is withdrawn. By such frequent agitation and freshened contact with the countercurrent stream of hot gases, the crystals, which are in soft masses to start with, do not aggregate more firmly but on the contrary are repeatedly separated, first by the expansion and evaporation of their free water content and ultimately by their own gaseous decomposition products. Moreover, after decomposition has taken place the residual finely divided ferric oxide, in continuing to pass in contact with the countercurrent stream of heated air and combustion gases only, is protected and prevented from coming into contact with the undecomposed crystals, steam, sulphur dioxide or sulphur trioxide, which are capable of combining therewith physically or chemically, or both. On the contrary it is cooled gradually in contact with the preheated air, upon the bottom hearth, before being withdrawn into the atmosphere for final cooling. Since the color of ferric oxide is largely affected by the conditions of temperature and the oxidizing conditions under which it cools, the appearance of the product thus obtained may be governed at this stage according to the purposes which it is intended to serve.

A convenient and typical form of apparatus, suitable for carrying out the process of the invention upon a commercial scale of operations, may be provided by modifying a furnace of the Herreshoff type, as shown in the accompanying drawings and in which Fig. 1 is a diametrical vertical cross section of the furnace, with attachments and supplementary devices;

Fig. 2 is an enlarged diametrical vertical cross section of the vent stack shown at the top of Fig. 1; and Fig. 3 is a horizontal cross section of the furnace, somewhat reduced and with a part broken away, in the plane 3—3 of Fig. 1.

As shown, the furnace is composed generally of a vertical cylindrical outer wall 1, more or less enclosed at the top by a cover or top wall 2, through which a hopper 3 is adapted to feed the raw material into the furnace and upon the top hearth 4. From there it may be fed through annular space 5, about the peripheral edge of the hearth 4, and fall upon the hearth 6. The hearth 6 has an opening 7 at its center through which the material of the charge may in turn fall upon the hearth 8. This hearth is solid at its center, but has an annular space 9 about its periphery similar to the hearth 4. Thus alternately the material is passed from the center of one hearth to its edge, over which it falls upon the outer portion of the next hearth and passes over the latter to the center, where it again falls through an opening to the hearth below. It thus passes from the outer portion of hearth 10 to its center 11, from the center of hearth 12 to its periphery 13, from the outer portion of hearth 14 to its center and through the opening 15 onto the center of the hearth 16, over its periphery 17 to the outer portion of the hearth 18 and thence to its center portion where it passes through the opening 19 and falls upon the central portion of the plate or lowermost hearth 20 which encloses the bottom of the furnace except for the discharge outlets 21.

Passing vertically upward through the center of the furnace is a hollow shaft 22, through which a current of air may be provided by the fan 23, and which may also be rotated by the motor 24, through the gears 25. The hollow shaft 22 carries an inner shaft 26, axially mounted therein which in turn carries spaced radial outlet tubes above each hearth, 27, 28, 29, 30, 31, 32, 33 and 34, each of which passes through similar radial arms 27', 28', 29', 30', 31', 32', 33' and 34', which extend from the outer shaft 22 and which, with a similar radial arm 36 above the top hearth 4, serve as rakes by having downwardly directed teeth 37 thereon and rotate above hearths 6, 8, 10, 12, 14, 16, 18, 20 and 4, respectively.

The space between such inner and outer radial tubes and arms provides for the supply and return of the air stream to each raker arm and thence to the space between the outer vertical shaft 22 and the inner vertical shaft 26. It then passes upwardly and combines with the currents of air forced directly upwardly and outwardly at 38. Thus the air supplied by the fan 23 passes up through the inner vertical tube 26, thence outwardly through the central tube of each of the radial arms extending over each of the hearths of the furnace, thence through the outer, annular space provided between the inner tube and outer wall of each arm, in contact with the outer wall to cool the same, and back into the annular space between the inner tube 26 and the outer wall of the central vertical tube 22, and thence out at 38.

The current of air thus produced, not only cools the shafts, the raker arms and teeth, but itself becomes heated substantially to the temperature of the furnace, though governed largely by the rate and volume of air which is passed through. The slower the rate or smaller the volume of air circulated, the higher the temperature it will attain.

This current of heated air is directed from the top of the shaft 22, into the T-shaped member 41, passing from there through the ducts 42 and 43, diametrically outward and downward, around the outside of the furnace and then through the diametrically opposed inlets 44, 45 through the side walls of the furnace onto the hearth 16, and also through diametrically opposite inlets 46, 47 onto the plate 20. Each of the inlets 44, 45, 46 and 47 is provided with a regulatable damper 50.

Three burners for supplying crude fuel oil, such as Bunker "C" oil, two of which are indicated at 51 and 52, are provided at 120° intervals above the hearth 10. Four similar burners of which three, 54, 55 and 56, are shown in Figs. 1 and 3, are provided at 90° intervals above hearth 16, and likewise four similar oil burners of which two, 57 and 58 appear in Fig. 1, and one, 59, in Fig. 3, above the bottom plate 20. The air for combustion is supplied to each burner by openings through the walls, in the customary way, but secondary fresh air is drawn into the furnace through the discharge opening 21 to some extent. Moreover, the air supplied to the burners may be somewhat in excess so as to afford an oxidizing atmosphere. But in addition to these sources of air supply, the preheated air forced through central shafts 22 and 26 as already described, is delivered across the tops of the hearths 20 and 16, and, in conjunction with the burner flame and combustion gases thereof, serve to heat these spaces and the charge upon the hearths to the maximum temperatures required. In such operation, a temperature schedule is preferably maintained, as follows:

| | °F. |
|---|---|
| Hearth 8 | 1350 |
| Hearth 12 | 1570 |
| Hearth 14 | 1500 |
| Hearth 18 | 1360 |

The temperature of the air returned through the air ducts into the furnace is slightly less but approximates that upon the hearths into which it is directed. This not only conserves heat but affords a large volume of fresh air directly in contact with the charge at that point in the operation when it is declining from its maximum temperature but undergoing its most active decomposition. This also serves to sweep away the gases and water vapor formed, thus removing from the residual charge of ferric oxide the other products of decomposition, leaving it to pass downward against a further supply of fresh, heated air to the bottom plate 20 where it is brought to a purified and highly oxidized condition in the presence of substantially pure air only. Under such conditions the color of the ferric oxide may be definitely controlled—higher temperatures such as those above yielding a rather dark colored ferric oxide, and lighter shades being obtainable by applying and maintaining lower temperatures, either throughout the furnace or upon the bottom plate, just before removal. Likewise a copious supply of fresh air promotes a brighter red while a reduced air supply results in a darker shade.

The combustion gases, heated air, steam and sulphur gases of decomposition all pass upwardly from hearth to hearth, countercurrent to, above and through the downward stream of copperas crystals, and finally out through the outlet 60 at the top of the furnace.

Some moisture may be expelled from the incoming charge of copperas while it is on the top hearth 4, in which case it will escape through the feed hopper and baffles 61 which serve in part to spread the charge over the top hearth, upon its entrance into the furnace.

In order to regulate the pressure and hence the rate of flow of the current of heated air from the shafts 22 and 26, a vent stack 62 is provided at the top of the furnace above the space 38, having a disk valve 63 mounted thereon, and adapted to close the vent stack 62, but capable of riding up upon the central guide rod 64, passing therethrough, which is held in place by the crossrod 65. The regulative effect of the valve 63 may be adjusted by correspondingly adjusting its weight or by putting on additional disks, etc.

The air stream may also be regulated by dampers 50 in each of the air ducts, adjacent to the hearths to which they lead. By thus regulating the pressure and rate of the current of preheated air (as well as by primary operation of the fan 23) its temperature may be effectively regulated, a slower stream in general acquiring a higher temperature and a faster stream a lower temperature. Or, the amount of air driven through the shafts 22 and 26 may be constant while the heated air delivered to the hearths may be reduced by permitting the escape of a part of the heated air stream, through the vent stack 62, or the dampers 50, 50 may be checked back, or both.

By thus subjecting wet copperas to a heat treatment as above described, in which the time of travel of the charge through the furnace was 3 hours and 30 minutes, it was found that not only was the excess of free moisture (approximately 10%) expelled, but also all of the water of crystallization or composition. Moreover, this was effected without any tendency for the charge to lump up or cake into solid masses which, in previous operations, has necessitated an interruption of all operations and barring or chiseling out the charge, in whatever type of furnace has been employed for the purpose, with consequent damage to the apparatus and to the charge of material under treatment, and great loss of time and reduction in yield or output.

In the operation of the present process, on the contrary, both the free moisture and the water of crystallization appear to be expelled without involving the caking of the charge, and at the elevated temperatures stated the charge as a whole disintegrates physically and decomposes chemically, simultaneously, to form finely divided, loose, ferric oxide powder, and gaseous water vapor, sulphur dioxide and sulphur trioxide, which are dispersed into the air stream and carried away from further contact or possible reaction with the liberated ferric oxide. These gases may react with the incoming charge of wet copperas. But if so, such reaction is beneficial, rather than otherwise, to promote the complete and quick decomposition which is desired, for they do not appear in any way to cause caking of the charge or to oppose its prompt and complete disintegration and decomposition.

The ferric oxide, being controllable as to color, and in uniformly finely divided condition, is suitable for many purposes where these properties are important desiderata. But it is also usually a relatively pure product, though dependent, of course, upon the source of the copperas fed to the process as a raw material. The very nature of the source of the copperas crystals, however, often leads to the formation of a very pure ferrous sulphate. This purity is preserved and enhanced by the present process in terms of the ferric oxide and sulphur dioxide and sulphur trioxide which it produces. Volatile and combustible impurities, for example, are completely expelled and separated. The sulphur dioxide and sulphur trioxide may be used directly or may be separately collected. The mixture may be oxidized to convert the sulphur dioxide to sulphur trioxide which is then used in known ways.

I claim:

1. Method of treating wet copperas crystals, $FeSO_4.7H_2O$, to convert the same to iron oxide, comprising the steps of continuously and positively passing the same through a succession of independent stages, independently heating and agitating the same in each stage, in contact with a counter current stream of hot gases, in such manner that the material first encounters hot gases containing oxidized sulphur gases at successively rising temperatures until after the zone at which decomposition is effected and then hot gases substantially free of oxidized sulphur gases at successively decreasing temperatures and finally removing iron oxide from the final zone.

2. Method of treating wet copperas crystals, $FeSO_4.7H_2O$, to convert the same to iron oxide, comprising the steps of continuously and positively passing the same through a succession of independent stages, independently heating and agitating the same in each stage, in contact with a counter current stream of hot gases, in such manner that the material first encounters hot gases containing oxidized sulphur gases at successively rising temperatures until after the zone at which decomposition is effected and then hot gases substantially free of oxidized sulphur gases at successively decreasing temperatures, submitting the material in the final zone to substantially pure heated air, and finally removing iron oxide from the final zone.

3. Method of treating wet copperas crystals, $FeSO_4.7H_2O$, to convert the same to iron oxide, comprising the steps of continuously and positively passing the same through a succession of independent stages, independently heating and agitating the same in each stage, in contact with a counter current stream of hot gases, in such manner that the material first encounters hot gases containing oxidized sulphur gases, diluted by gases of combustion of carbonaceous fuel, at successively rising temperatures until after the zone at which decomposition is effected, and then hot gases substantially free of oxidized sulphur gases at successively decreasing temperatures and finally removing iron oxide from the final zone.

4. Method of treating wet copperas crystals, $FeSO_4.7H_2O$, to convert the same to iron oxide, comprising the steps of continuously and positively passing the same through a succession of independent stages, independently heating and agitating the same in each stage, in contact with a counter current stream of hot gases, in such manner that the material first encounters hot gases containing oxidized sulphur gases, diluted by an oxidizing gas, at successively rising temperatures until after the zone at which decomposition is effected and then hot gases substantially free of oxidized sulphur gases at successively decreasing temperatures and finally removing iron oxide from the final zone.

5. Method of treating wet copperas crystals, $FeSO_4.7H_2O$, to convert the same to iron oxide, comprising the steps of continuously and positively passing the same through a succession of independent stages, independently heating and agitating the same in each stage, in contact with a counter current stream of hot gases, in such manner that the material first encounters hot gases containing oxidized sulphur gases, diluted by an oxidizing gas and gases of combustion of carbonaceous fuel, at successively rising temperatures until after the zone at which decomposition is effected and then hot gases substantially free of oxidized sulphur gases at successively decreasing temperatures and finally removing iron oxide from the final zone.

ALFRED W. WHITFORD.

REFERENCES CITED

The following references are of record in the file of this patent:

UNITED STATES PATENTS

| Number | Name | Date |
|---|---|---|
| 786,567 | Ingalls | Apr. 4, 1905 |
| 846,444 | Bailey | Mar. 12, 1907 |
| 1,048,247 | Weeks | Dec. 24, 1912 |
| 1,093,749 | Weaver | Apr. 21, 1914 |
| 1,489,347 | Davison | Apr. 8, 1924 |
| 1,630,881 | Zalocostas | May 31, 1927 |
| 1,636,296 | Elliott | July 19, 1927 |
| 2,086,206 | Bailey | July 6, 1937 |
| 2,143,805 | Smith | Jan. 10, 1939 |
| 2,184,738 | Fireman | Dec. 26, 1939 |
| 2,242,763 | Smith | May 20, 1941 |
| 2,287,094 | Farmer et al. | June 23, 1942 |